(12) United States Patent
Langlotz et al.

(10) Patent No.: US 11,027,305 B2
(45) Date of Patent: Jun. 8, 2021

(54) ACCOMMODATING MEANS FOR A DISPENSING CONTAINER

(71) Applicant: BODE CHEMIE GMBH, Hamburg (DE)

(72) Inventors: Christian Langlotz, Hamburg (DE); Stefan Kuboteit, Seevetal (DE)

(73) Assignee: Bode Chemie GmbH, Hamburg (DE)

( * ) Notice: Subject to any disclaimer, the term of this patent is extended or adjusted under 35 U.S.C. 154(b) by 0 days.

(21) Appl. No.: 16/341,509

(22) PCT Filed: Oct. 16, 2017

(86) PCT No.: PCT/EP2017/076306
§ 371 (c)(1),
(2) Date: Apr. 12, 2019

(87) PCT Pub. No.: WO2018/069544
PCT Pub. Date: Apr. 19, 2018

(65) Prior Publication Data
US 2019/0366378 A1    Dec. 5, 2019

(30) Foreign Application Priority Data
Oct. 14, 2016  (DE) .................... 10 2016 119 609.6

(51) Int. Cl.
| | | |
|---|---|---|
| A47K 5/12 | (2006.01) | |
| B05B 15/62 | (2018.01) | |
| F16M 13/02 | (2006.01) | |

(52) U.S. Cl.
CPC ............ *B05B 15/62* (2018.02); *A47K 5/1205* (2013.01); *F16M 13/02* (2013.01); *A47K 2201/02* (2013.01)

(58) Field of Classification Search
CPC ...... A47K 5/12; A47K 5/1205; A47K 5/1211; A47K 5/1217; A47K 5/1201; A47K 2201/02; A47K 2201/025; B05B 15/62
(Continued)

(56) References Cited

U.S. PATENT DOCUMENTS

| | | |
|---|---|---|
| 3,032,081 A | 5/1962 | Cotta |
| 4,667,854 A | 5/1987 | McDermott et al. |

(Continued)

FOREIGN PATENT DOCUMENTS

| | | |
|---|---|---|
| CA | 2181319 A1 | 2/1997 |
| CA | 2365147 A1 | 8/2002 |

(Continued)

OTHER PUBLICATIONS

International Search Report and Written Opinion from PCT/EP2017/076306 dated Dec. 12, 2017.
German Search Report dated May 31, 2017.

*Primary Examiner* — Charles P. Cheyney
(74) *Attorney, Agent, or Firm* — Dilworth & Barrese, LLP

(57) ABSTRACT

The invention relates to a container receiving device (10) for a dispensing container (28), in particular dispensers for liquid media, comprising a housing (12) comprising four side walls (14, 16, 18) and a housing bottom (20) for receiving the dispensing container (28) and a housing lid (22), with a securing device (47) for the dispensing container (28), with the securing device (47) comprising a latch (50) movable between a locking position and a release position, with the latch (50) in the locking position being moved into a region above a wall of a dispensing container (25) located in the container receiving device (10), so that the dispensing container (28) is secured against removal from the container (Continued)

Figure 1:
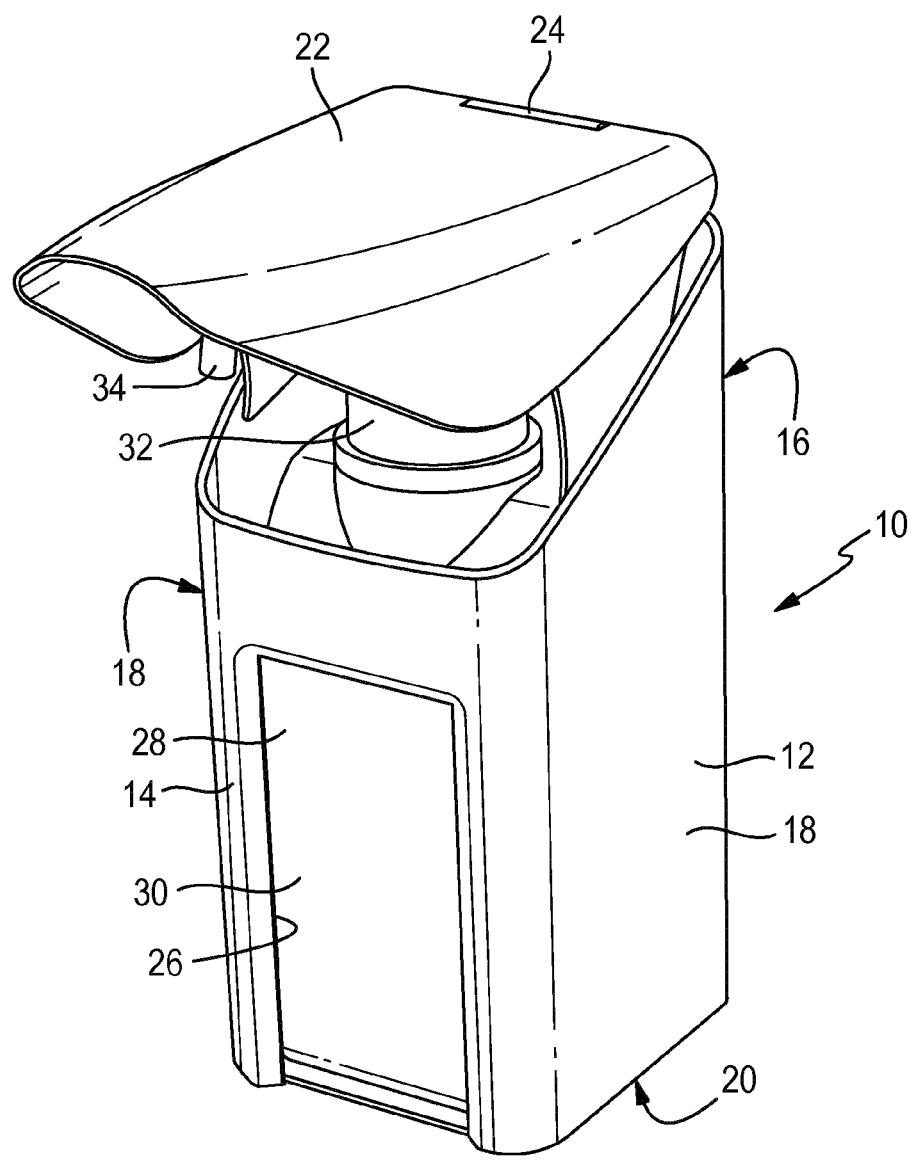

receiving device (10) and in the release position is moved, in particular pivoted, out of the region.

18 Claims, 4 Drawing Sheets

(58) Field of Classification Search
USPC ............................. 222/173, 180, 181.3, 182
See application file for complete search history.

(56) References Cited

U.S. PATENT DOCUMENTS

| | | | |
|---|---|---|---|
| 4,765,515 A * | 8/1988 | Lippman | A47K 5/12 |
| | | | 222/162 |
| 5,992,698 A | 11/1999 | Copeland et al. | |
| 6,131,773 A | 10/2000 | Wade et al. | |
| 6,209,184 B1 | 4/2001 | Copeland | |
| 6,325,245 B1 | 12/2001 | Matthews | |
| 6,820,770 B2 * | 11/2004 | Makino | A47K 5/12 |
| | | | 222/180 |
| 7,156,353 B2 * | 1/2007 | Kringel | A47F 7/283 |
| | | | 215/399 |
| 7,748,573 B2 * | 7/2010 | Anhuf | A47K 5/12 |
| | | | 16/361 |
| 8,668,178 B2 * | 3/2014 | Ziaylek | F17C 13/084 |
| | | | 224/570 |
| 9,437,103 B2 * | 9/2016 | Ophardt | A47K 5/1202 |
| 9,770,141 B2 * | 9/2017 | Wegelin | A47K 5/1205 |
| 10,182,685 B2 * | 1/2019 | Ophardt | A47K 5/1205 |
| 2005/0284888 A1 * | 12/2005 | Rhodenbaugh | G01F 11/028 |
| | | | 222/181.3 |

FOREIGN PATENT DOCUMENTS

| | | |
|---|---|---|
| DE | 19628172 A1 | 2/1997 |
| DE | 102011115712 B3 | 4/2013 |
| DE | 102012014863 A1 | 1/2014 |
| EP | 30113202 A1 | 12/2014 |
| WO | 02060308 A1 | 8/2002 |
| WO | 2014209636 A1 | 12/2014 |

* cited by examiner

ACCOMMODATING MEANS FOR A DISPENSING CONTAINER

This application claims priority to German Patent Application No. 102016119609.6 filed on Oct. 14, 2016, the entire contents of which are incorporated by reference herein in their entirety.

The invention relates to a container receiving device for a dispensing container, in particular a dispenser for liquid media, with a housing comprising four side walls and a housing bottom for receiving the dispensing container and a housing lid, with the container receiving device having a device for securing the dispensing container.

Such container receiving devices are known in the art and may, for example, be provided as freestanding or affixable to mounting surfaces, such as walls or brackets, in particular in a detachable manner.

A corresponding device is for example described in DE 10 2011 115 712 B3. In the case of this container receiving device, the actual dispenser, which may, for example, be a dispenser for soap or disinfectant or the like, is accommodated in a receiving device, which may be secured to a support bracket to prevent theft. By means of the support bracket, the container receiving device may be affixed, for example, to a wall. Moreover, the prior art has means for preventing removal that are to prevent the removal of the actual dispenser from the mounted receptacle. A bottom plate is provided for this purpose, which prevents withdrawal of the bottle as long as the receptacle is attached to the support bracket. It is therefore relatively time consuming to replace a dispensing container such as a dispenser.

Other container receiving devices are previously known, e.g., from U.S. Pat. No. 6,131,773, wherein a soap dispenser may be secured to a back plate via a latch plate by securing a lid over the dispenser to prevent unauthorized removal and the cover being removable from the back plate by actuating a hidden mechanism and thus the dispenser itself may be removed.

Furthermore, a removal preventing means for dispenser bottles is known from EP 30113202 A1, wherein the dispenser is clasped in the neck region of the dispenser bottle and the removal of the bottle from the container receiving device is thus prevented. A key is needed to remove the lock. It is generally disadvantageous if keys must be provided to secure a dispensing container in the container receiving device, because such keys must then be carried by staff entrusted with the exchange and refilling of the dispensing containers in relevant institutions, such as hospitals or nursing homes, or such keys for locking container receiving devices or other securing devices remain on the container receiving device for convenience, so that the effect is negated.

Such dispensing containers, in particular dispensers for liquid media, are essentially designed in two variants, i.e. firstly so that the dispensing aperture is located at the top of the container in the use position, or optionally so that the dispensing aperture is located at the bottom of the container in the use position, where the directions top and bottom and vertical and horizontal hereinafter describe the normal use position or operating state and the normal configuration. Provision is usually made that a container receiving device may always be newly provided with a dispensing container. The dispensing container may preferably be a dispenser for liquid media, which is either already provided with a pump or is disposed of together with the pump or in which the pump is designed to be a reusable device, which is removed after the dispensing container has been emptied, preferably is reconditioned and is then mounted together with another dispensing container replaced into the container receiving device.

It is desirable that such dispensing containers cannot be removed by unauthorized personnel.

The invention achieves this object by means of a container receiving device that has the characteristics of claim 1.

The container receiving device has a securing device comprising a latch which is moveable, in particular pivotable, between a release position and a locking position, wherein the latch in the locking position is moved into, in particular pivoted into, a region above a wall of a dispensing container located in the container receiving device, so that the dispensing container is secured against removal from the container receiving device and is moved out, in particular pivoted out, of the area in the release position.

The receiving containers are preferably dispensers for products that are applied as liquids, in particular as viscous liquids, as a gel, as an emulsion or as a foam, and are suitable for cleaning, the care and/or the disinfection of objects and/or surfaces, or for cleaning, the care and/or the disinfection of hands and/or skin areas of people and animals. The receiving containers are particularly preferably dispensers for hand disinfectants, in particular dispensers for alcoholic hand disinfectants.

The securing device particularly comprises an actuating device for the latch, in particular a latch plate extending along one of the side walls and vertically linearly movable between two end plates, which latch plate puts the latch in a locking position in a first limit position and in a release position in a second limit position.

Also considered as actuating devices are, e.g. rotary elements, which are coupled to the pivot axis of the latch. The latch may alternatively also be moved translationally and may, for example, be pulled out of the housing in a release position and be inserted into the housing in the form of a panel in the blocking position.

If a latch plate is provided, the latch may be moved via the movable latch plate, which may be moved vertically up or down in an operating position, with the latch in particular being able to pivot between a locking position and a release position, and the latch being disposed in the locking position, such that it pivots into a region located above a wall of the dispensing container when the direction of removal of the dispensing container is provided vertically towards the top, thus blocking the removal action. In particular with ordinary dispensing containers, such as dispensers, having a bottom and a cylindrical or cubic housing and a container top, which then has the opening for receiving a pump, for example, provision may be made for the latch to pivot into the region above the top side, so that in the event of an unauthorized attempt at removal, the top side abuts the latch and the dispensing container cannot be pulled past the latch and the dispensing container thus remains in the housing.

It is particularly advantageous that the latch does not have to come into direct contact with the dispensing container in order to achieve a locking position. It is thus not necessary to provide a precise fit of the securing device to the respective dispensing container, which in turn means that container receiving devices, which may be used for different dispensing containers, may be provided. The device furthermore is of a simple design and may preferably be produced as a plastic injection molded part.

According to a particularly preferred embodiment, the latch plate may extend in the inside of the housing, in particular in the region of a side wall in the back. This way the latch plate is not visible from the outside and in particular when the latch plate extents in the region of the rear side wall in the usual setup position of the container receiving device, the latch plate is hardly noticeable, so that an undesirable operation of the securing device of the dispensing container is avoided, without keys or the like having to be provided.

Provision is preferably made for the latch plate to have an actuating means, which reaches through a side wall or the bottom of the housing and is graspable and movable by a user and transfers the movement to the latch plate. Other actuating means are alternatively conceivable, which e.g., interact only with the latch plate for purposes of actuation and otherwise do not engage the latter. The actuating means may in particular be rigidly connected to the latch plate or be part of the latter. In particular when the actuating means is provided on the bottom or the back wall of the housing, there is the particular advantage that it is not immediately visible. It is in particular possible to make provisions for the actuating means not to jut out substantially beyond the housing or, if provided, a drip tray connected thereto, and in particular to be held and hidden therein. It is thus possible to have a protected configuration while simplifying the actuation of the securing device.

It is further particularly preferred that the latch plate has an angled section pointing into the interior of the container, on which a dispensing container placed into the housing comes to rest. A linear vertical movement of the locking plate thus also causes the dispensing container to move linearly upwards and to thus get into a position in which it is easier to remove when it is moved vertically upwards by a person entrusted with the replacement. The vertical movement of the dispensing container may simultaneously initiate the pivoting movement of the latch. Alternatively, it is also possible to provide a component on the latch plate, which component converts the vertical movement of the latch plate to a rotational movement of the latch.

The latch is preferably mounted pivotable about in particular a horizontal axis on the housing. In this way, it may be moved very easily by the latch plate. Provision may furthermore be made for the latch to have first abutment means, with which it abuts in the locking position against the locking plate or the housing and the latch is thus fixed in the locking position.

Provision may furthermore be made for the housing and/or the latch plate to have an opening which passes through the first abutment means of the latch in the release position, so that movement of the latch is enabled.

Provisions may be made for the first abutment means to only pass through the opening in the locking plate and the housing when the locking plate is arranged in a vertically upward shifted end position and an opening in the locking plate is thus brought into alignment with an opening in the housing.

Provisions may furthermore be made in a preferred embodiment for the latch plate and/or the latch to have a stop limiting moving of the latch out of the area of an installed collecting container. It is possible to allow the latch to move under any circumstance by limiting the pivoting movement of the latch in its limit positions, inasmuch as there is a risk that in particular a gravity-induced movement is no longer possible in the limit positions of approximately 180°, i.e. parallel to the latch plate.

The latch plate may furthermore comprise means which initiate and control the pivoting movement of the latch.

Provisions may be made for the latch plate to transition from the release position to the locking position by means of gravity or via a spring force.

It is particularly preferred that the locking position is automatically occupied if the actuating device of the securing device is not actuated. This ensures that under any circumstance a securing device engages when a dispensing container is received and secures the latter against unwanted removal.

It is particularly further preferred that a side wall constituting the front side of the housing, i.e. a side wall which normally faces a user of the dispensing container, is provided with an opening, in particular with a viewing window. It is by means of this opening that a label or sign on the dispensing container may be made visible and this furthermore enables fill-level control.

It is furthermore particularly preferred that a drip tray is connectable to the bottom and/or the side walls of the housing, in particular detachably interlockable. Provisions may in particular be made that the drip tray is only detachable from the housing when the actuating device is actuated. Provisions may be made for the drip tray to have locking elements which abut corresponding surfaces of the housing, in particular the bottom of the housing, e.g., engage through the floor for this purpose, with the locking elements being prevented from engaging with the corresponding surfaces of the housing by being moved in the horizontal direction. It is preferably only possible to displace the drip tray horizontally when the actuating device is actuated. To ensure this, provisions may in particular be made for the actuating device to also engage a recess in the drip tray and to be disengaged from the drip tray when it is actuated, so that the drip tray may then be displaced.

This makes it possible for the drip tray to be cleaned separately and in particular to only be cleaned and removed if the dispensing container is removed at the same time. The risk of dirtying the floor or surfaces because of liquid undesirably leaking from the dispensing container is further reduced thereby.

When it is attached to the housing, the drip tray may serve as the base of the container receiving device.

Provisions are lastly preferably made for the container receiving device to be produced as a plastic part, particularly as injection molded parts, so that simple and cost-effective provisioning may be achieved.

Provisions may furthermore be made for the housing and the dimensions of the latch to be dimensioned such that the dispensing container cannot be pulled from the housing past the securing device. A dimension here means an extension in a cross-sectional plane of the dispensing container. The housing may in particular be adapted to fit the shape of the dispensing container. However, the adaptation may be configured so that different dispensing containers may be accommodated in a container receiving device. However, it is, for example, also possible to accommodate cylindrical dispensing containers in cubic housings.

In a further embodiment, the lid may be pivotably articulated on the housing, preferably about a horizontal axis. The lid may furthermore preferably have centering means, in particular centering ribs, on the side pointing in the direction of the inside of the housing, which ribs establish the position of a received dispensing container in the housing.

It is, in particular, possible to accommodate a dispensing means of a dispenser in recesses on the underside of the lid, in particular in the centering means, and to thereby secure it. This ensures that improper filling of the container receiving device may be reliably prevented, so that liquid potentially dripping down is collected in a drip tray (if provided).

Provision may further, in particular, be made for the lid to serve as an actuating element of a dispensing container configured as a dispenser. This means, a pump of the dispensing container is actuated by moving, i.e. pivoting the lid, about its pivot axis, so that a predetermined amount of liquid may be removed from the dispensing container.

Provisions may further in particular be made for the container receiving device to be configured as a standing unit. Alternatively or additionally, it may also be mountable to a wall or bracket, for example, by means of screws or nails, which engage with openings of the container receiving device provided in the housing, or by means of adhesive pads disposed between the wall and container receiving device.

Further advantages and features of the invention will become apparent from the other application documents and the following description of the figures.

Figure 2:
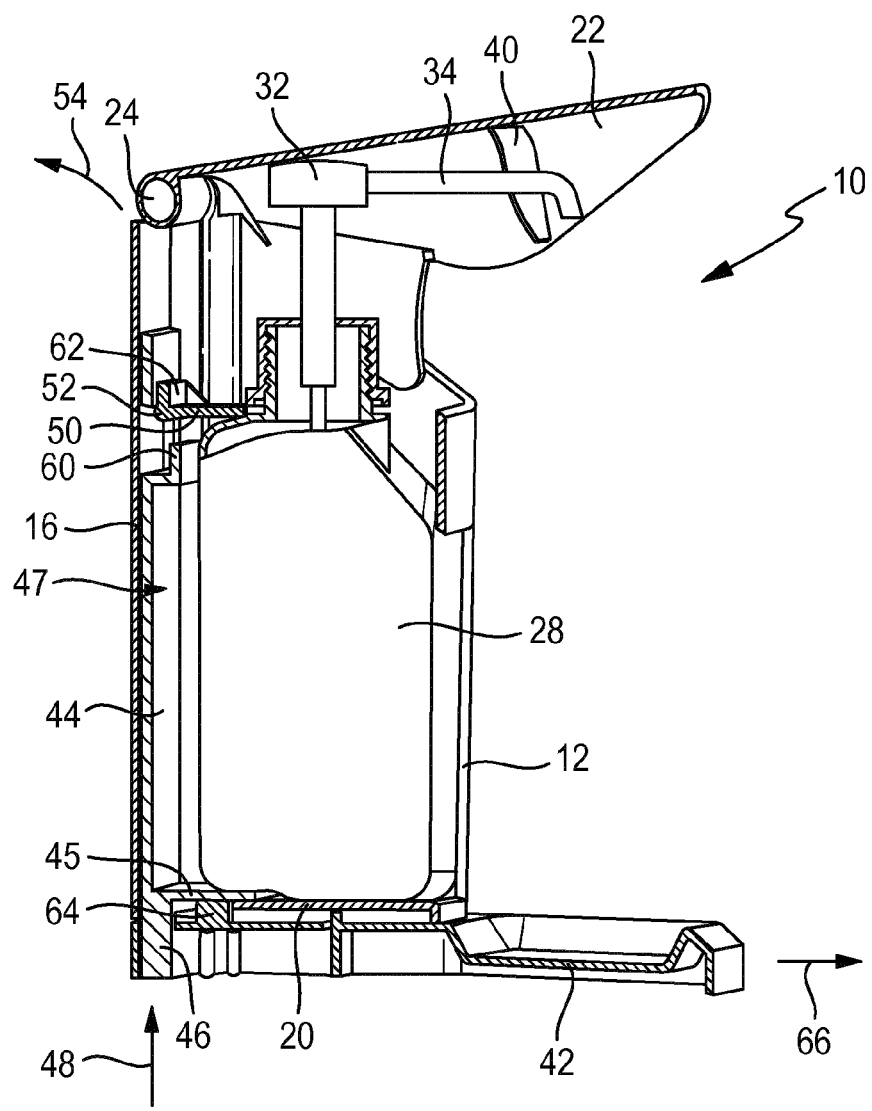
Figure 4:
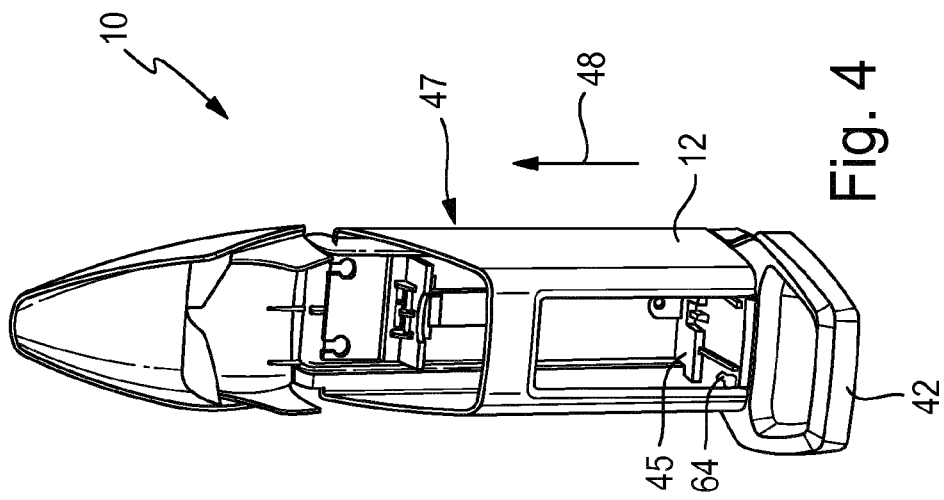
Figure 3:
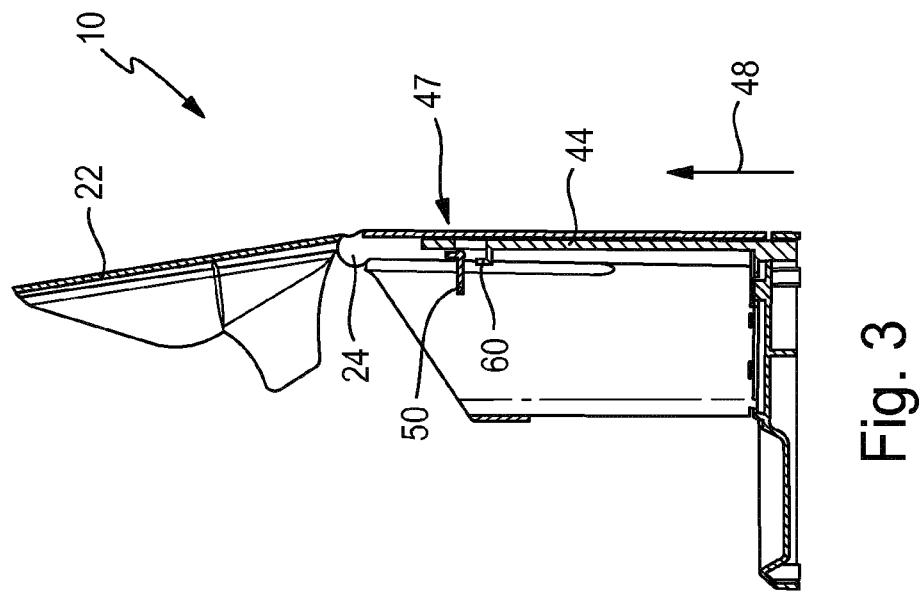
Figure 6:
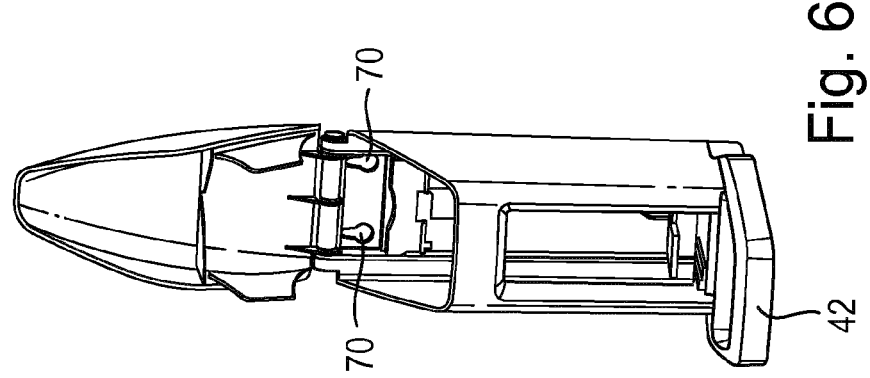
Figure 5:
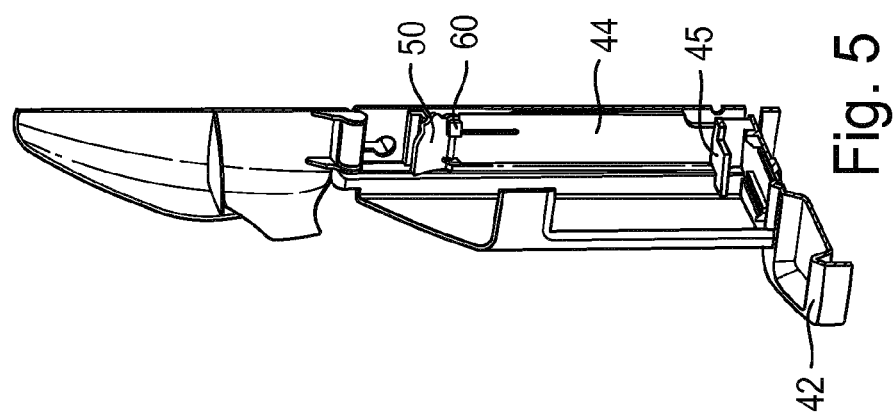

The figures show:

FIG. 1 a perspective view of a container receiving device according to the invention;

FIG. 2 a container receiving device according to FIG. 1 with a drip tray in cross-section;

FIG. 3 a container receiving device according to FIG. 2 without a receiving container in cross-section;

FIG. 4 a perspective view of the container receiving device according to FIG. 3;

FIG. 5 a view of a container receiving device without a receiving container, with securing device in the release position, and FIG. 6 a perspective view according to FIG. 5.

FIG. 1 shows a container receiving device, which in its entirety is assigned the reference number 10. The latter comprises a housing 12 having four side walls and in particular in a use position a front side 14 as well as a rearward side wall 16 and two remaining side walls 18. The housing further comprises a bottom 20, and the container receiving device 10 further has a lid 22 which is, in the present case flexibly connected to the one-piece housing. In particular, the backside of the of the lid 22 is provided with a hinge 24 by means of which the lid is connected to the rearward side wall 16. The housing has an opening 26 at the front extending to the bottom 20, through which a dispensing container 28 accommodated in the housing 12, in particular a dispenser, e.g. for disinfectants, is visible, so that it is possible to check the level and to read a label (not shown). The housing 12 has a substantially rectangular cross-section with rounded edges substantially tailored to fit the shape of the dispensing container 28. The container receiving device may be designed such that dispensing containers 28 from different manufacturers and of different brands may be accommodated in the container receiving devices 10. The dispensing container provided here is a commercially available disinfectant dispenser for hand disinfection comprising a reservoir 30 and a pump 32 with a dispensing means 34. When pressing the lid 22, the latter is pivoted about the hinge 24 and thus presses on the dispensing means 34, so that the pump 32 is actuated and a defined amount of liquid is conveyed out of the reservoir 30 and is dispensed.

FIG. 2 shows the container receiving device 10 in a cross-sectional view, where it can be seen that centering ribs 40 are provided in the lid 22, through which the dispensing means 34 of the dispenser 32 extents such that the dispensing means 34 is centered such that it is supported over a drip tray 42 provided here. In addition, mistakes during the insertion of the dispensing container 28 are prevented.

The region of the rearward side wall 16 is provided with a locking plate 44 as part of a securing device 47, which may also be an injection molded part like the entire container receiving device 10. The locking plate engages through the bottom of the housing and the drip tray 42 and has an actuating device 46 flush-mounted with the bottom of the drip tray 42 by means of which the locking plate is moved vertically upward 48 in the direction of the arrow 48 upon applying pressure. The container receiving device 10 further comprises a latch 50, which is affixed to the housing 12 pivotable about a horizontal axis 52, with the locking plate 44 cooperating in its linear movement with the latch 50 such that the latch 50, with respect to its free end, is moved (pivoted) upward and backward in the direction of the arrow 54 during the linear movement of the latch plate 44 vertically upward (arrow 48).

The latch 50 is shown in FIG. 2 in a first locking position in which it is located in the region above a wall of a dispensing container 28 located in the container receiving device 10; the latch 50 may, in particular, also abut the dispensing container 28. By arranging the latch 50 in the region above a wall of the dispensing container 28, vertical removal of the dispensing container 28 upward in the direction of arrow 48 is also prevented as long as the latch 50 is in the locking position. If the latch plate 44 is now moved vertically upwards by moving the latch plate 44 by means of the actuating device 46, the latch 50 is pivoted backward and upward with respect to its free end in the direction of the arrow 54 and thus enters a release position, in which it comes to rest outside the range of the dispensing container 28. For this purpose the locking plate 44 may have means 60 which initiate the pivoting movement of the latch 50. Additionally, abutment means 62, which define a limit position of the latch both in the release position and in the locking position, may be provided on the latch.

Additionally, a drip tray 42 is provided, with the drip tray 42 also being engaged by the actuating means 46 and the latch plate 44, and only being separable from the housing 12 when the actuating device 46 is disengaged from the drip tray 42 in the direction of arrow 48. The drip tray 42 has locking elements (assigned the reference numeral 64) for this purpose, which engage through openings in the housing bottom 20 and are fixed there in an interlocking manner. Moving the actuating device 46 in the direction of the arrow 48 out of engagement with the drip tray 42, allows the drip tray to be pulled forward in the horizontal direction 66 with the locking device 64 coming out of engagement with the floor 20.

In addition, the locking plate 44 has an angled section 45 in the region of the bottom 20 of the housing extending into the interior of the housing, so that the dispensing container 28 comes to rest on the angled section. If the actuating device 46 is then actuated, the dispensing container 28 is also moved upward, so that the removal of the dispensing container from the housing 12 of the container receiving device is facilitated.

FIG. 3 shows a design according to FIG. 2 with the receiving container removed from the container receiving device 10. The lid 22 is pivoted about the hinge 24 from its position shown in FIG. 2, in which centering ribs 40 are in contact with the dispensing means 34 of the dispensing container 28. The securing device 47 is in the locking position, i.e. the latch 50 is in an essentially horizontal position and the latch plate 44 is in its vertically downward oriented position. The means 60, which so initiates the pivoting movement of the latch when a movement of the latch plate 44 in the direction of the arrow 48 occurs and then holds the latch 50 fast in the open position in that a portion of the latch 50 dips into the hook-shaped receptacle of the means 60, is clearly visible.

FIG. 4 shows a perspective view of the container receiving device 10 according to FIG. 3 without the dispensing container 28, with the securing device 47 also shown here in the locking position. The angled section 45 of the latch plate 44, on which the dispensing container 28 comes to rest and is moved with the latch plate 44 in the direction of the arrow 48 when being the latch plate is transferred to the release position (see FIGS. 5 and 6) is clearly visible. Also visible are the locking elements 64, which engage through the openings in the bottom 20 and have hook-shaped heads, which interact with the floor when moved in the openings when moving against the direction of the arrow 66 in FIG. 2 due to the shape of the opening and thus cause the drip tray 42 to be locked to the housing 12.

FIGS. 5 and 6 now show the container receiving device in a release position, wherein the latch 50 is pivoted in the direction of the arrow 54 of FIG. 2 so that the latch 50 dips into the means 60. It can also be seen that the angled section 45 is shifted vertically upward relative to the view in FIGS. 3 and 4. The latch 50 now unlocks an area above a dispensing container (not shown), so that the dispensing container 28 may be pulled past the latch 50. The position of the dispensing container 28, which is displaced vertically upwards, facilitates removal due to the angled section 45.

In addition, in this position, the latch plate 44 is out of engagement with the drip tray 42, so that a horizontal displacement of the drip tray in the direction 66 according to FIG. 2 is possible in principle and the drip tray may thus be removed, for example, for cleaning purposes.

As can be seen in FIGS. 3 to 6, the housing further has openings 70 on the rearward side wall 6, via which wall mounting may be provided. Fasteners, such as nails or screws, may engage in these openings 70 provided on the wall side. The drip tray 42 may alternatively serve as a base.

The invention claimed is:

1. A container receiving device (10) for a dispensing container (28), comprising a housing (12) comprising four side walls (14, 16, 18) and a housing bottom (20) for receiving the dispensing container (28) and a housing lid (22) with a securing device (47) for the dispensing container (28), wherein the securing device (47) comprises a latch (50) which is movable between a locking position and a release position, with the latch (50) in the locking position being moved into a region above a wall of a dispensing container (28) located in the container receiving device (10) so that the dispensing container (28) is secured against removal from the container receiving device (10) and in the release position is moved;
   wherein the securing device (47) comprises an actuating device (46) for the latch (501) which in a first limit position moves the latch (50) into a locking position and in a second limit position moves the latch (50) into a release position;
   wherein the actuating device for the latch comprises a linearly movable latch plate (44) extending vertically on one of the side walls (16) between two limit positions and wherein the latch plate (44) extends in the interior of the housing; and
   wherein the latch plate (44) has an angled section (45) pointing into the interior of the container, on which a dispensing container (28) inserted into the housing (12) comes to rest, so that the dispensing container (28) is movable with the latch plate (44).

2. The container receiving device of claim 1, wherein a drip tray (42) is connectable to the bottom (20) and/or the side walls of the housing (12).

3. The container receiving device of claim 1, wherein the actuating device (46) passing through a side wall or the bottom (20) of the housing (12).

4. The container receiving device of claim 3, wherein a drip tray (42) is connectable to the bottom (20) and/or the side walls of the housing (12) and wherein the actuating device (46) does not extend beyond the housing (12) and/or the drip tray (42).

5. The container receiving device of claim 3, wherein a drip tray (42) is connectable to the bottom (20) and/or the side walls of the housing (12) and wherein the drip tray (42) is only detachable from the housing (12) when the actuating means (46) is actuated.

6. The container receiving device of claim 2, wherein the drip tray (42) forms a base of the container receiving device (10).

7. The container receiving device of claim 1, wherein the latch (50) is mounted on the housing (12).

8. The container receiving device of claim 1, wherein the latch (50) has a first abutment means, with which it abuts against the latch plate (44) or the housing (12) in the locking position.

9. The container receiving device of claim 8, wherein the housing (12) and/or the latch plate (44) have an opening which engages through the first abutment means in the release position, so that movement of the latch (50) is enabled.

10. The container receiving device of claim 1, wherein the latch plate (44) and/or the latch (50) has a stop which limits the movement of the latch (50) out of the region of a received dispensing container (28).

11. The container receiving device of claim 1, wherein the latch plate (44) and/or the latch (50) has a stop, which limits the movement of the latch (50) in the locking position in the direction of the bottom of the container (20).

12. The container receiving device of claim 1, wherein the latch (50) and/or the latch plate (44) is transferable from the release position into the locking position of the latch (50) by gravity and/or by a spring force.

13. The container receiving device of claim 1, wherein the side wall forming a front side (14) of the housing (12) is provided with an opening (26).

14. The container receiving device of claim 1, wherein the housing (12) is fitted to a shape of the dispensing container (28).

15. The container receiving device of claim 1 wherein the lid (22) is pivotably articulated on the housing (12).

16. The container receiving device of claim 1, wherein the lid (22) has on its side pointing towards the interior of housing, centering devices (40), which determine the position of a received dispensing container (28) and/or of a dispensing means (34) present in the dispensing container.

17. The container receiving device of claim 1, wherein the lid (22) serves as an actuating element of a dispensing container (28) configured as a dispenser.

18. The container receiving device of claim 1, wherein the container receiving device (10) is designed as a self-standing device and/or as a wall-mountable device.

* * * * *